(12) United States Patent
Hecht

(10) Patent No.: US 7,597,508 B2
(45) Date of Patent: Oct. 6, 2009

(54) CUTTING TOOL

(75) Inventor: Gil Hecht, Nahariya (IL)

(73) Assignee: Iscar, Ltd. (IL)

( * ) Notice: Subject to any disclaimer, the term of this patent is extended or adjusted under 35 U.S.C. 154(b) by 56 days.

(21) Appl. No.: 11/687,144

(22) Filed: Mar. 16, 2007

(65) Prior Publication Data

US 2007/0231089 A1 Oct. 4, 2007

(30) Foreign Application Priority Data

Mar. 30, 2006 (IL) .................................... 174670

(51) Int. Cl.
*B23B 27/16* (2006.01)
(52) U.S. Cl. .................. 407/101; 407/103; 407/113
(58) Field of Classification Search .......... 407/101, 407/103, 104, 107, 113–117; B23B 27/06; B23D 1/00
See application file for complete search history.

(56) References Cited

U.S. PATENT DOCUMENTS

| 1,365,683 | A | * | 1/1921 | Griffith .................... 29/35.5 |
| 3,182,534 | A | * | 5/1965 | Hoffmann ..................... 82/157 |
| 3,520,042 | A | * | 7/1970 | Stier ........................... 407/89 |
| 3,613,197 | A |   | 10/1971 | Stier |
| 4,169,690 | A |   | 10/1979 | Kendra |
| 4,462,725 | A | * | 7/1984 | Satran et al. ................... 407/92 |
| 4,512,689 | A | * | 4/1985 | Bylund ........................ 407/40 |
| 4,755,085 | A | * | 7/1988 | Muren et al. ................. 407/113 |
| 5,004,379 | A |   | 4/1991 | Little |
| 5,308,197 | A |   | 5/1994 | Little |
| 6,527,485 | B1 | * | 3/2003 | Little .......................... 407/24 |
| 6,612,207 | B2 |   | 9/2003 | Schiffers |
| 6,942,434 | B2 |   | 9/2005 | Friedman et al. |
| 7,407,347 | B2 | * | 8/2008 | Virtanen et al. ............. 407/110 |
| 7,419,338 | B2 | * | 9/2008 | Smilovici et al. ........... 407/113 |
| 2003/0156910 | A1 |   | 8/2003 | Friedman |
| 2003/0165362 | A1 | * | 9/2003 | Hecht ......................... 407/107 |

FOREIGN PATENT DOCUMENTS

| DE | 3241 748 A1 | 11/1982 |
| DE | 10012821 | 9/2001 |
| WO | WO 98/01249 | 1/1998 |

* cited by examiner

*Primary Examiner*—Boyer D Ashley
*Assistant Examiner*—Sara Addisu
(74) *Attorney, Agent, or Firm*—Womble Carlyle

(57) ABSTRACT

The disclosure provides a cutting tool which may utilize the manner in which a cutting insert is supported therein to better retain the cutting insert. The disclosure also provides a method of assembling the cutting insert in the cutting tool in a manner which may increase the cutting accuracy of the cutting tool.

16 Claims, 6 Drawing Sheets

CUTTING TOOL

BACKGROUND

The present disclosure relates to cutting tools having cutting inserts, which are detachably secured in an insert holder.

In such cutting tools a cutting insert may abut the insert holder at several abutment regions. These abutment regions apply reaction forces to the cutting insert during a cutting operation. These reaction forces may be utilized to better secure the cutting insert in the insert holder.

SUMMARY

The following embodiment and aspects thereof are described and illustrated in conjunction with systems, tools and methods, which are meant to be exemplary and illustrative, not limiting in scope.

In one aspect, the present invention is directed to a cutting insert having an insert axis (B) with five-fold rotational symmetry. The cutting insert has two identical opposing end surfaces, a cylindrical through bore extending axially along the insert axis (B) and connecting the two identical opposing end surfaces, and a peripheral side surface located between the end surfaces and being divided into five identical segments. Each segment extends between the end surfaces and is located between a pair of adjacent segments; each segment has a cutting section located between a leading wall located on a leading surface and a trailing wall located on a trailing surface; the trailing surface of one segment and the adjacent leading surface of an adjacent segment meet at a corner which forms a radially innermost portion of the peripheral side surface; and the trailing surface of one segment and the adjacent leading surface of an adjacent segment diverge outwardly from the corner in a direction away from the insert axis (B).

In another aspect, the present invention is directed to a cutting tool comprising a cutting insert of the sort described above retained in an insert holder. The insert holder has a forward securing portion and a rear body portion. The forward securing portion comprises a base and securing surface, the securing surface including a first support, a second support and a third support which all extend transversely to the base. At least a portion of the first support abuts at least a portion of a trailing wall of a first segment of the cutting insert; at least a portion of the second support abuts at least a portion of a leading wall of a second segment of the cutting insert, the second segment being adjacent to the first segment; at least a portion of the third support abuts at least a portion of trailing wall of a third segment of the cutting insert, the third segment being adjacent to the second segment; and the trailing wall of the third segment of the cutting insert generally faces upwardly.

In yet another aspect, there is provided a cutting tool comprising a cutting insert and an insert holder; the cutting insert comprises a first wall, a second wall, a third wall and at least one cutting section; the at least one cutting section comprises a cutting edge located between a rake face and a relief face; the rake face extends rearwardly from the cutting edge and the relief face extends downwardly from the cutting edge and away from the rake face. Therefore, cutting forces acting on the at least one cutting section during a cutting operation are mainly directed towards the rake face in a generally downward direction.

The insert holder comprises a forward securing portion and a rear body portion; the securing portion comprises a first support, a second support and a third support; at least a portion of the first support abuts at least a portion of the first wall along a first abutment region, at least a portion of the second support abuts at least a portion of the second wall along a second abutment region and at least a portion of the third support abuts at least a portion of the third wall along a third abutment region, wherein the first and the second abutment regions diverge downwardly and the second and the third abutment regions diverge rearwardly.

The first, second and third supports of the insert holder react to the cutting force acting on the at least one cutting section by applying reacting forces to the cutting insert in directions perpendicular to the first, second and third abutment regions respectively. The rearwardly diverging second and third abutment regions therefore apply rearwardly converging reacting forces towards the body portion and away from the at least one cutting section which assist to retain the cutting insert in the insert holder.

The above embodiment provides also the advantage that the securing portion is a rigid and non-resilient body which generally does not deform when subjected to forces and, therefore, may provide large reaction forces to the cutting insert at the first second and third abutment regions.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
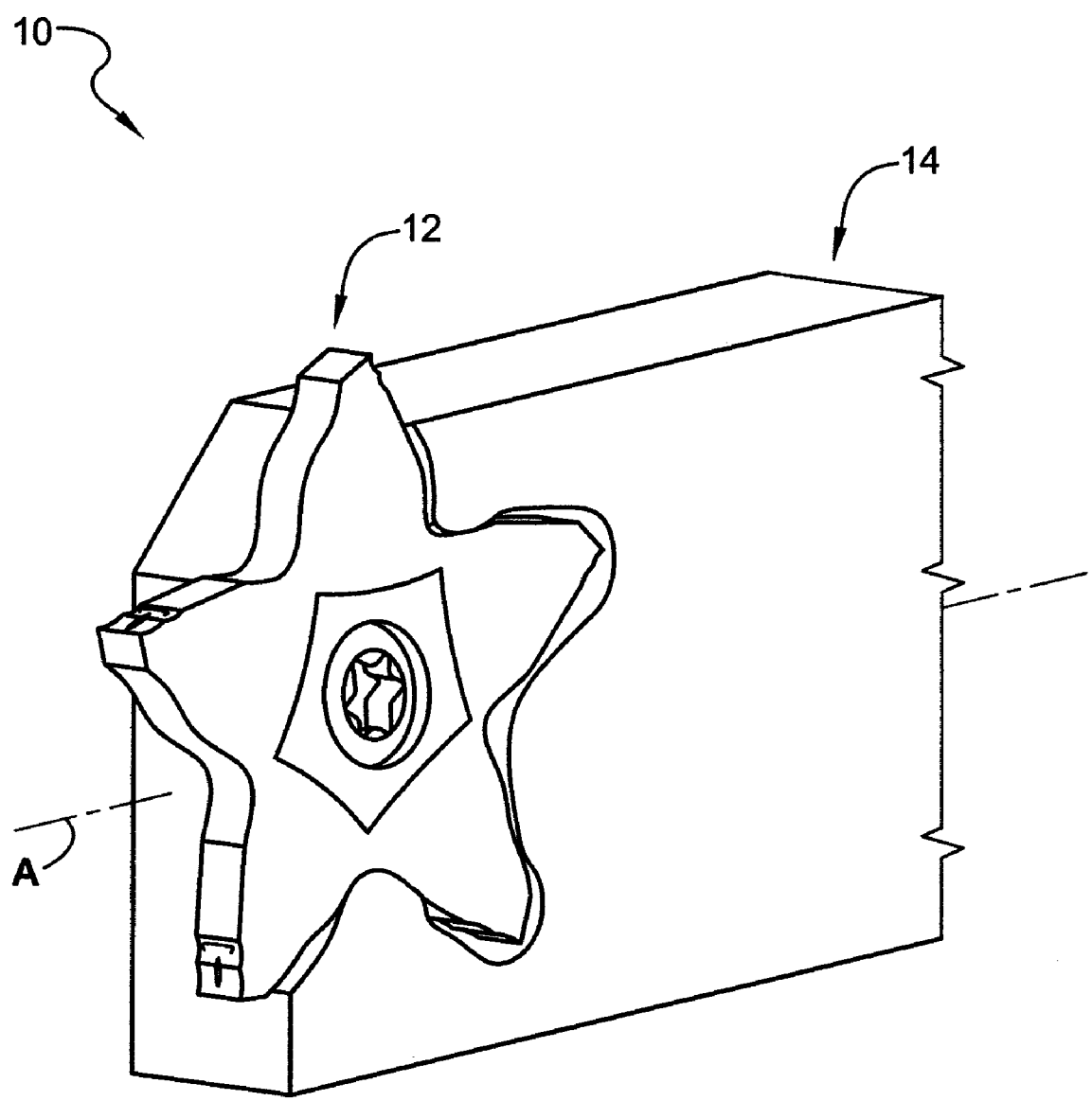
FIG. 1 shows a perspective view of a cutting tool in accordance with the present disclosure showing a cutting insert secured in an insert holder.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 showing a right hand cutting tool 10 having a longitudinal tool axis A that defines a forward to rear direction. The cutting tool 10 which may be used in grooving, parting or turning operations has a cutting insert 12 that is located at a forward end of an insert holder 14. The same cutting insert 12 can be used for both right-handed and left-handed cutting operations, and as such, can be part of the right hand cutting tool 10 (FIG. 1) or a left hand cutting tool (not shown). The description herein will refer to the right hand cutting tool 10 and to the cutting insert 12 and the insert holder 14 as they appear in the right hand cutting tool 10, but may also relate to a left-handed cutting tool.

The cutting insert 12 may be produced by form pressing and/or sintering a hard body which may be made from a carbide powder such as Tungsten Carbide or any other appropriate material such as ceramic materials and the like, as described in the World Directory and Handbook of Hardmetals, Fifth Edition, published by International Carbide Data, which is incorporated by reference herein. However, the cutting insert 12 may also be produced by injection molding. The insert holder 14 may be formed of machined steel or other hard materials. The present disclosure will be described herein with reference to a non-rotary cutting tool; however, it will be clear to the skilled person in the art that it may be applied also to rotary cutting tools in which the cutting insert is detachably secured. It should be noted that directional terms appearing throughout the specification and claims, such as "forward", "rear", "up", "down" and the like, (and derivatives thereof) are for illustrative purposes only, and are not intended to limit the scope of the appended claims. In addition, it is noted that the directional terms "down", "below" and "lower" (and derivatives thereof) define identical directions.

Figure 2:
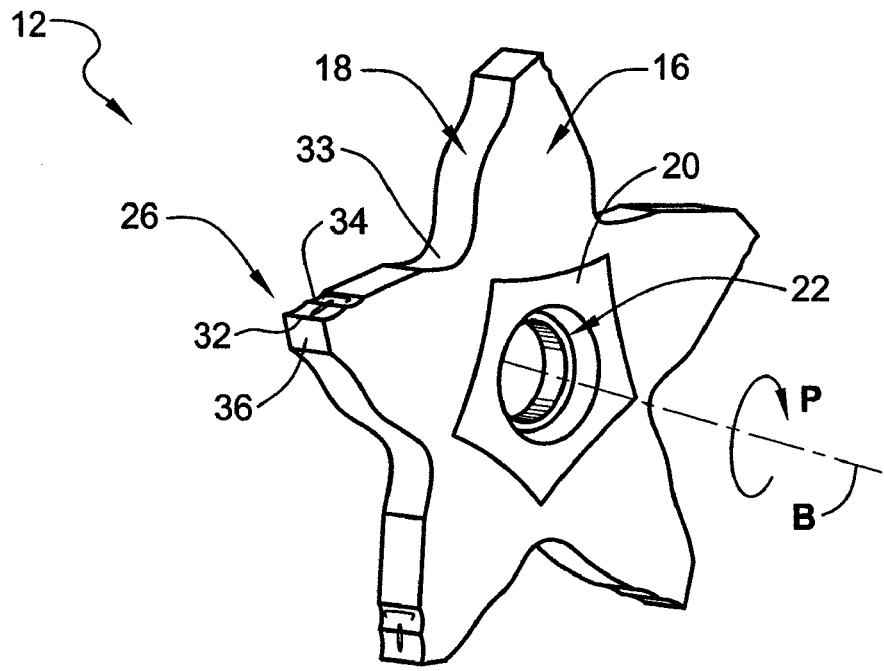
FIG. 2 shows a perspective view of a cutting insert.

Attention is now drawn to FIG. 2. The cutting insert 12 has an insert axis B, two identical opposing end surfaces 16 (only one is seen in FIG. 2) and a peripheral side surface 18, which is located between the end surfaces 16. Each end surface 16 has a flat abutment surface 20, (one is seen in FIG. 2) which is perpendicular to the insert axis B and protrudes axially above the end surface 16. A cylindrical bore 22 of the cutting insert 12 extends axially along the insert axis B and opens out to each abutment surface 20. A five-fold rotational symmetry exists in the cutting insert 12 about the insert axis B, and the insert axis B has a positive direction P and an opposing negative direction N which are defined thereabout.

Figure 3:
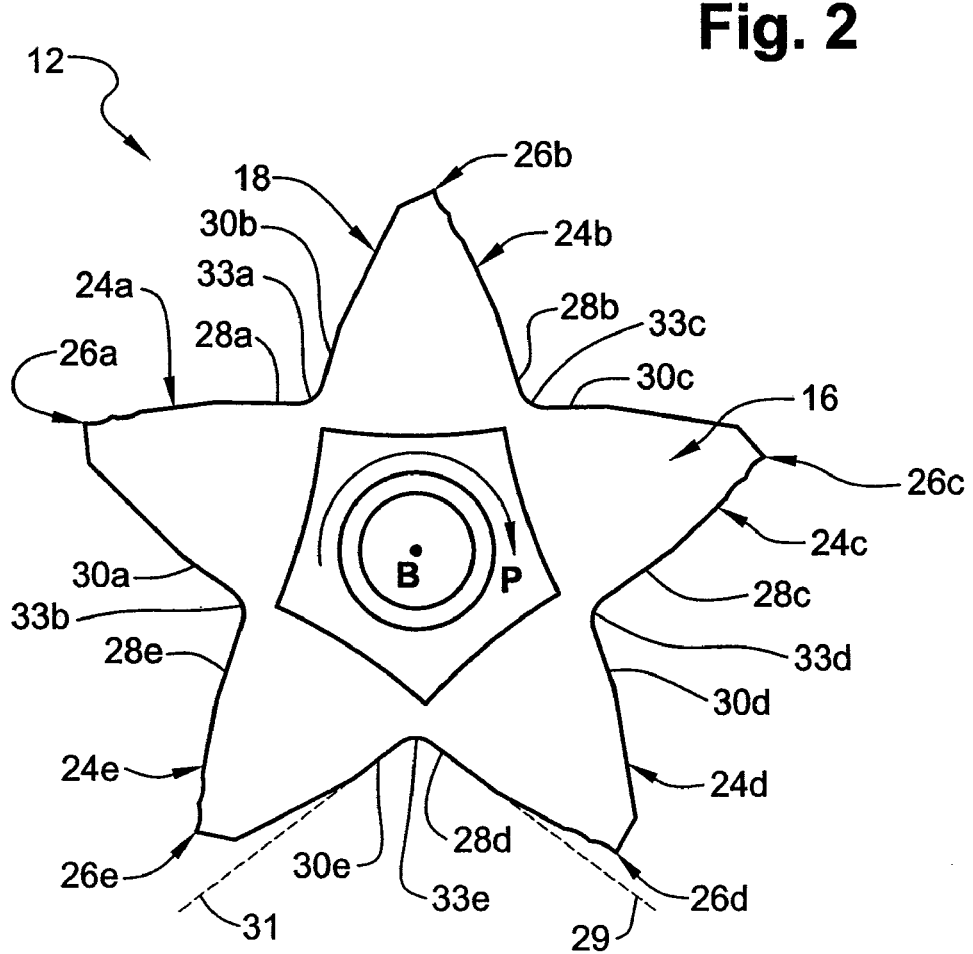
FIG. 3 shows a side view of a cutting insert.

Attention is now additionally drawn to FIG. 3, which shows a side view of a cutting insert. The side surface 18 is divided into five identical segments 24(a-e). Each segment 24 extends between the end surfaces 16 and is located between a pair of adjacent segments 24 which meet at rounded corners 33 forming the radially inwardmost portions of the peripheral side surface 18. For example, segment 24a is located between segments 24b and 24e. Each segment 24(a-e) has a cutting section 26(a-e) respectively, which is located between a flat leading wall 28(a-e) respectively, and a flat trailing wall 30(a-e respectively). Each leading wall 28(a-e) faces the positive direction P and is located adjacent a positive end of the segment 24(a-e). Each trailing wall 30(a-e) faces the negative direction N and is located adjacent to a negative end of the segment 24. Each cutting section 26 (see for example, FIG. 2) has a cutting edge 32, which is located between a rake face 34 and a relief face 36. Each cutting edge 32 extends between the end surfaces 16, and the rake face 34 generally faces the positive direction P. Each trailing wall 30 is located on an imaginary trailing surface 31, and each leading wall 28 is located on an imaginary leading surface 29 (only one imaginary trailing surface 31 and one imaginary leading surface 29 are marked). The leading surface 29 of one segment and the trailing surface 31 of an adjacent segment meet at one of the corners 33(a-e) which are the radially inwardmost portion of the cutting insert's peripheral surface 18. From the corner 33(a-e), the trailing and leading surfaces 31, 29 of adjacent segments 24 diverge outwardly in a direction away from the insert axis B.

Figure 4:
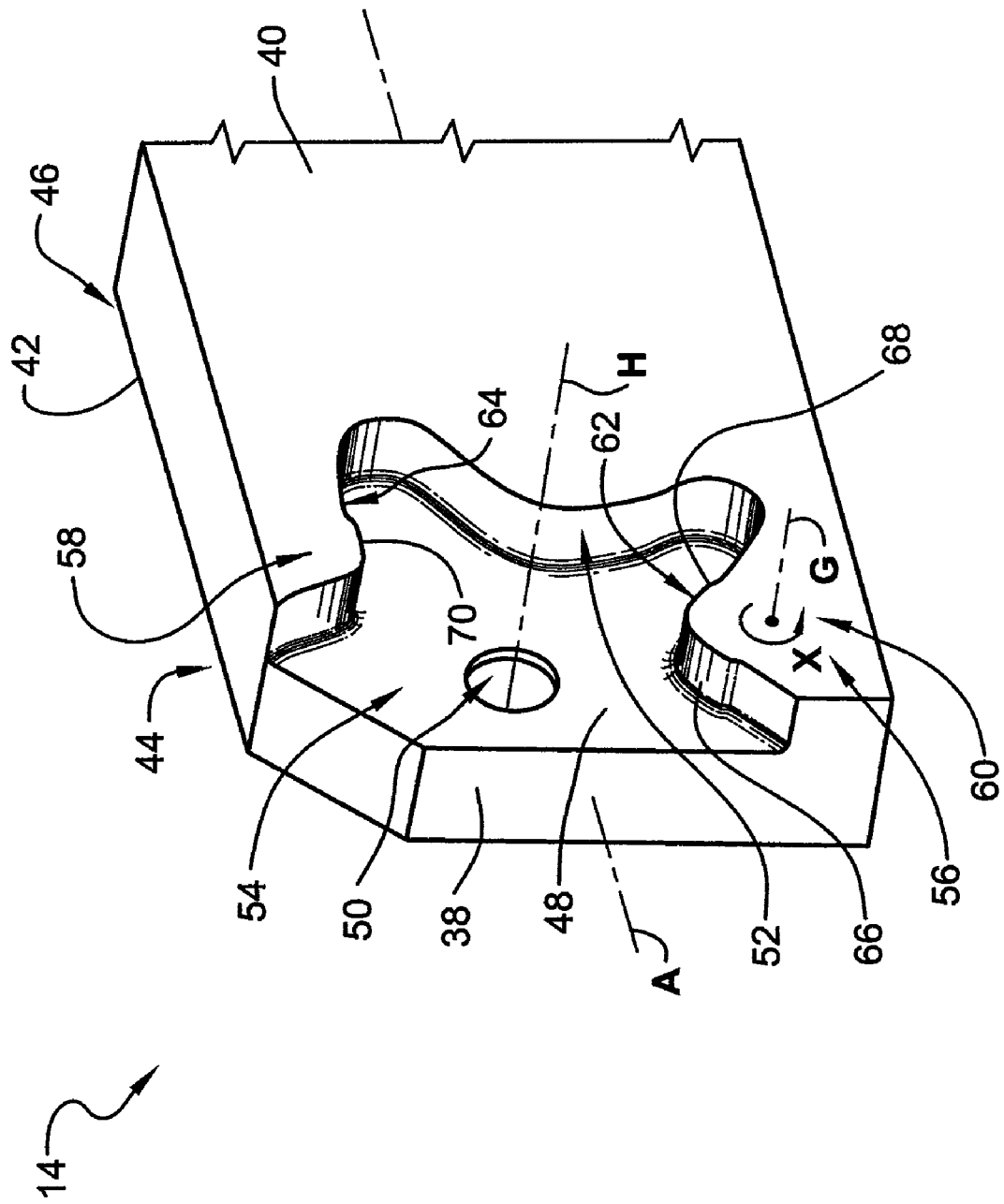
FIG. 4 shows a perspective view of an insert holder.
Figure 5:
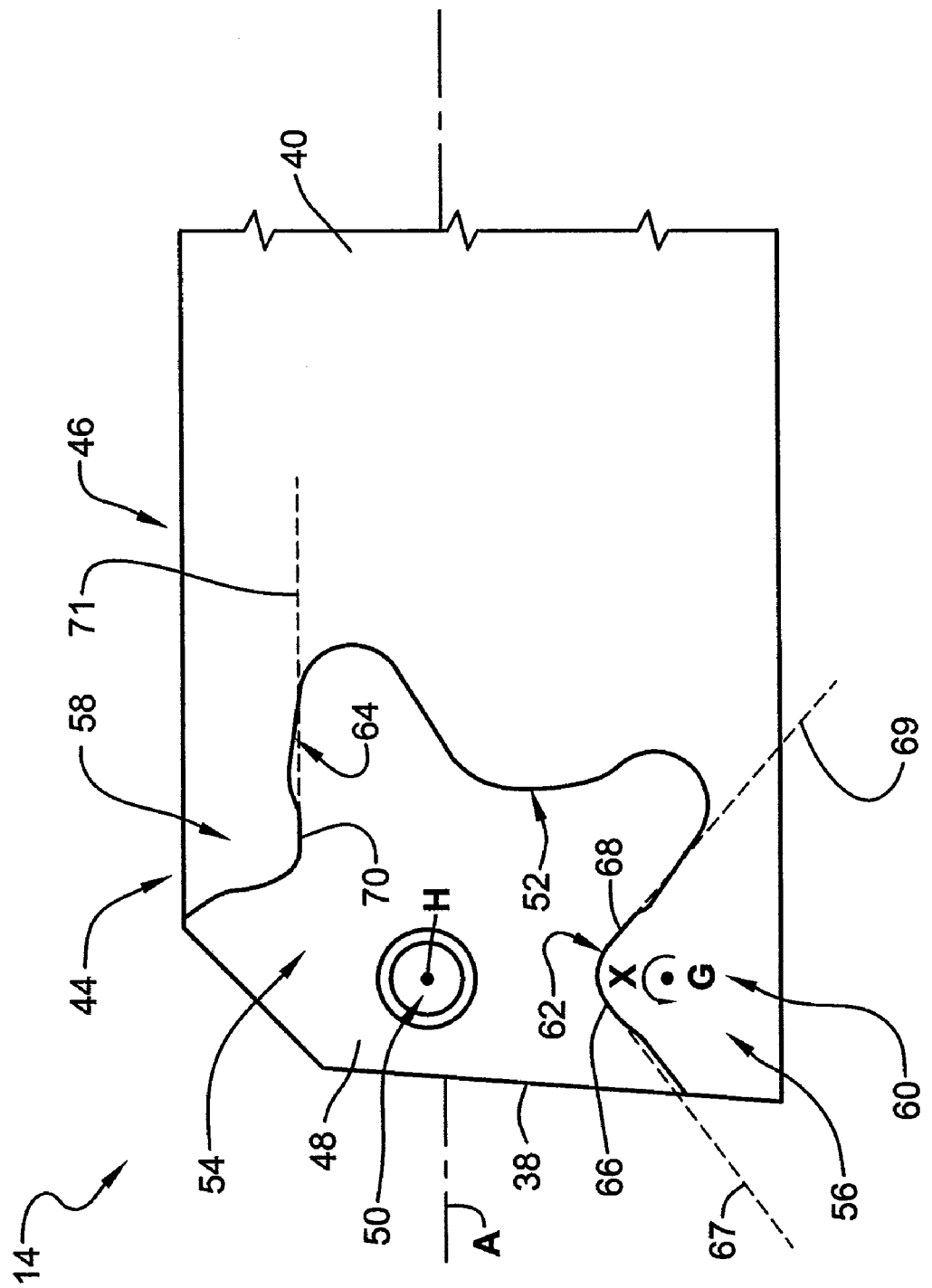
FIG. 5 shows a side view of an insert holder.

Attention is now drawn to FIGS. 4 and 5 which show a perspective view and a slide view of an insert holder, respectively. The insert holder 14 has a forward holder face 38 and a pair of opposing parallel first and second flank faces 40, 42 (only the first flank face 40 can be seen). The first and second flank faces 40, 42 extend along the tool axis A, and the holder face 38 is located at a forward end of the insert holder 14. The insert holder 14 is also divided into a forward securing portion 44 and a rear body portion 46. The securing portion 44 has a base 48, a threaded hole 50 and a securing surface 52. The base 48 is parallel to the first flank faces 40 and 42, and the hole 50, which is formed in the securing portion 44, extends along a holder axis H and opens out to the base 48. The holder axis H is perpendicular to the tool axis A, and the securing surface 52 extends uprightly from the base 48 along the holder axis H to the first flank face 40.

The base 48 and the securing surface 52 define an insert pocket 54 which opens out to a forward end of the tool holder 14 at the holder face 38 and to the first flank face 40. The securing portion 44 has a lower bulge 56 and an upper bulge 58. The lower bulge 56 has a root 60 from which it projects mainly upwardly and slightly forwardly and rearwardly into the insert pocket 54 along a lower support portion 62 of the securing surface 52. A bulge axis G having an axis direction X, which is defined thereabout, is located in the vicinity of the root 60 of the lower bulge 56. The bulge axis G is parallel to the holder axis H and located generally below the holder axis H. The upper bulge 58 projects forwardly into the insert pocket 54 along an upper support portion 64 of the securing surface 52.

The securing surface 52 has a forward first support 66 and a rear second support 68 on its lower support portion 62. The axis direction X of the bulge axis G generally follows a path from the second support 68 along the lower support portion 62 to the first support 66. A generally downwardly facing third support 70 of the securing surface 52 is located on the upper support portion 64. The first support 66 is located on an imaginary first surface 67 (FIG. 5), the second support 68 is located on an imaginary second surface 69 (FIG. 5) and the third support 70 is located on an imaginary third surface 71 (FIG. 5). The imaginary first and second surfaces 67, 69 diverge downwardly in a direction away from the third support 70, and the imaginary second and third surfaces 69, 71 diverge rearwardly.

Figure 6:
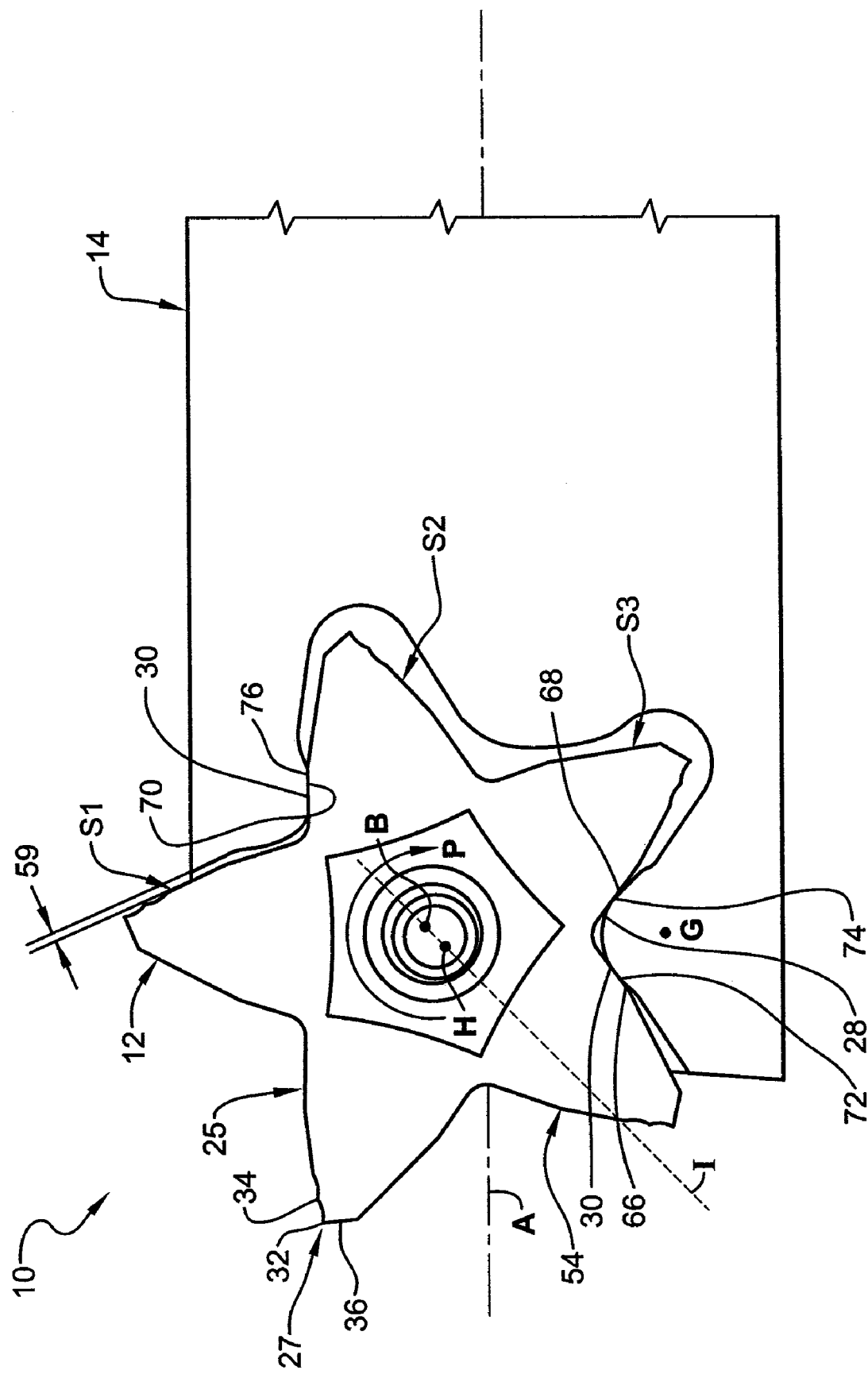
FIG. 6 shows a side view of a cutting tool showing the cutting insert located in the insert holder.

Attention is now drawn to FIG. 6 to show an initial assembly position of the cutting tool 10. The cutting insert 12 is placed in the insert pocket 54 in a way that one of its abutment surfaces 20 (not shown) generally faces the base 48 (which can be seen in FIGS. 4 and 5) of the insert holder 14, and one of its segments 24 (as seen in FIG. 3) is an operative segment 25 which has an operative cutting section 27 that is located at a forward end of the cutting tool 10. In the operative cutting section 27 the rake face 34 faces upwardly and extends rearwardly from the cutting edge 32, and the relief face 36 extends downwardly from the cutting edge 32 and away from the rake face 34.

In the cutting tool 10, the segment adjacent the operative segment 25 in the positive direction P will be referred to herein as segment S1, and the remaining three consecutive segments that follow in the positive direction P will be respectively referred to herein as segments S2, S3 and S4. The trailing wall 30 of segment S2, the leading wall 28 of segment S3 and the trailing wall 30 of segment S4 will be respectively referred to herein as a third wall 76, a second wall 74 and first wall 72.

The first, second and third walls 72, 74, 76 of the cutting insert 12, respectively, face the first, second and third supports 66, 68, 70 of the insert holder 14 in the initial assembly position of the cutting tool 10. The first and second supports 66, 68 diverge downwardly, and the second and third supports 68, 70 diverge rearwardly. In addition, in the initial assembly position of the cutting tool 10, the hole 50 (not shown) of the insert holder 14 is eccentric in relation to the bore 22 of the cutting insert 12. The eccentricity is such that the holder axis H is located forwardly and downwardly in relation to the insert axis B. An imaginary axis plane I which includes the holder and the insert axes H, B passes the bulge axis G from a forward direction. That is to say that a portion of the axis plane I is located forwardly in relation to the bulge axis G.

Figure 7:
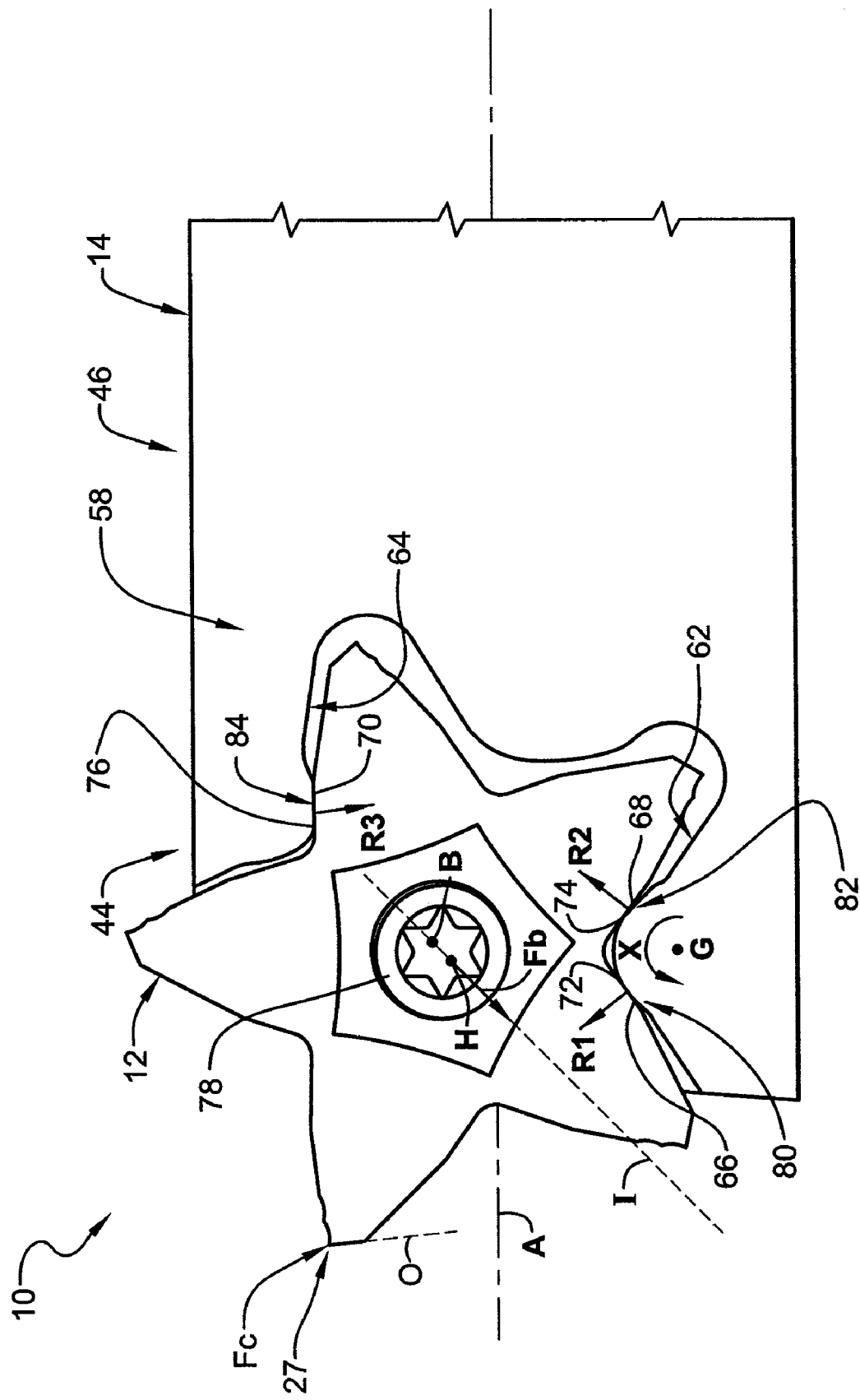
FIG. 7 shows a side view of a cutting tool showing a cutting insert secured in an insert holder.

Attention is now additionally drawn to FIG. 7 showing a final assembled position of the cutting tool 10. To secure the cutting insert 12 in the insert holder 14, a fastener 78 of the cutting tool 10 is placed through the bore 22 and screwed into the hole 50 (which can be seen in FIGS. 4 and 5). Due to the eccentricity of the bore 22 and the hole 50, the screwing of the fastener 78 into the hole 50 applies a biasing force $F_B$ to the cutting insert 12 in a direction from the insert axis B through the holder axis H along the axis plane I. The biasing force $F_B$ first urges the cutting insert 12 to an intermediate assembly position in which the cutting insert respectively bears against the first and the second supports of the lower support portion 62 with the first wall 72 and the second wall 74. Further screwing of the fastener 78 into the hole 50 applies an additional biasing force $F_B$ which further urges the cutting insert forwardly and downwardly and thereby forms a loading moment, which urges the cutting insert 12 to rotate about the bulge axis G in the axis direction X until the third wall 76 of the cutting insert 12 bears against the upper support portion 64.

In the final assembled position of the cutting tool 10, a portion of the first wall 72 abuts and bears against a portion of the first support 66 along a first abutment region 80, a portion of the second wall 74 abuts and bears against a portion of the second support 68 along a second abutment region 82, and a portion of the third wall 76 abuts and bears against a portion of the third support 70 along a third abutment region 84. The first 66, second 68 and third 70 supports constitute the only abutment surfaces between the securing surface 52 of the forward securing portion 44 and the peripheral side surface 18 of the cutting insert 12.

Consequently, the insert holder 14 applies to the cutting insert 12 a first reaction force R1 in a direction perpendicular to the first abutment region 80, a second reaction force R2 in a direction perpendicular to the second abutment region 82, and a third reaction force R3 in a direction perpendicular to the third abutment region 84. The second and the third reaction forces R2, R3 converge to a point rear of the insert axis B in a direction towards the body portion 46 and, therefore, assist to retain the cutting insert 12 in the securing portion 44.

It is noted that in the final assembled position of the cutting tool 10, a gap 59 is formed between the cutting insert 12 and a forward portion of the upper bulge 58, which is located at a forward end thereof and faces forwardly.

During a cutting operation, the operative cutting section 27 is exposed, for example, to a generally downwardly directed cutting force $F_C$ which is included in an imaginary operative plane O, which preferably passes the bulge axis G from a forward direction. That is to say that a portion of the operative plane O is located forwardly in relation to the bulge axis G. Therefore, the cutting force $F_B$ preferably urges the cutting insert 12 to additionally bear against the lower support portion 62 and forms the loading moment, which urges the cutting insert 12 to rotate about the bulge axis G in the axis direction X, and thereby additionally bear against the upper support portion 64. The cutting force $F_C$ therefore preferably increases, for example, the second and the third reaction forces R2, R3, which assist to retain the cutting insert 12 in the securing portion 44 during the cutting operation.

The biasing force $F_B$ and preferably also the cutting force $F_C$ both contribute to the formation of the first, second and third abutment regions 80, 82, 84. In other words, the biasing force $F_B$ biases the cutting insert 12 towards its position in the cutting tool 10 during a cutting operation. Therefore, the biasing force $F_B$ may be referred to as a pre-loading force which stabilizes the position of the operative cutting section 27 in the cutting tool 10 during a cutting operation. This, in turn, increases the cutting accuracy of the cutting tool 10.

In order to resist the cutting force $F_C$ acting of the cutting insert 12 during a cutting operation and provide the first, second and third reaction forces R1, R2, R3, the securing portion 44 may have unitary one-piece construction, which is rigid and non-resilient. This means that the upper bulge 58 and the lower bulge 56 may be an integral and non-resilient part of the securing portion 44.

Although the present embodiment has been described to a certain degree of particularity, it should be understood that various alterations and modifications could be made without departing from the scope of the disclosure as hereinafter claimed.

What is claimed is:

1. A cutting tool having a tool axis (A) establishing a forward-to-rear direction, the cutting tool comprising a cutting insert, an insert holder and a fastener,
    the cutting insert having an insert axis (B), opposing end surfaces, a bore extending along the insert axis between the end surfaces, and a peripheral side surface located between the end surfaces, the peripheral side surface comprising a first wall, a second wall, a third wall and at least one operative cutting section,
    the insert holder comprises a forward securing portion and a rear body portion, the forward securing portion comprises a base, a hole and securing surface, the hole extending along a holder axis and opening out to the base, the securing surface including a first support, a second support and a third support which all extend transversely to the base,
    at least a portion of the first support abuts at least a portion of the first wall along a first abutment region, at least a portion of the second support abuts at least a portion of the second wall along a second abutment region and at least a portion of the third support abuts at least a portion of the third wall along a third abutment region, wherein:
    the first and the second abutment regions diverge downwardly, the second and the third abutment regions diverge rearwardly, and the third wall generally faces upwardly; and
    the fastener is located in the bore and the hole.

2. The cutting tool according to claim 1, wherein the at least one operative cutting section comprises a cutting edge located between a rake face and a relief face, the rake face extending rearwardly from the cutting edge and the relief face extends downwardly from the cutting edge and away from the rake face.

3. The cutting tool according to claim 1, wherein the securing portion is rigid and non-resilient.

4. A cutting tool having a tool axis (A) establishing a forward-to-rear direction, the cutting tool comprising a cutting insert and an insert holder,
    the cutting insert having an insert axis (B), and a peripheral side surface comprising a first wall, a second wall, a third wall and at least one operative cutting section,
    the insert holder comprises a forward securing portion and a rear body portion, the forward securing portion comprises a base and securing surface, the securing surface including a first support, a second support and a third support which all extend transversely to the base, at least a portion of the first support abuts at least a portion of the first wall along a first abutment region, at least a portion of the second support abuts at least a portion of the second wall along a second abutment region and at least a portion of the third support abuts at least a portion of the third wall along a third abutment region, wherein:

the first and the second abutment regions diverge downwardly, the second and the third abutment regions diverge rearwardly, and the third wall generally faces upwardly;

the cutting insert's peripheral side surface is divided into five identical segments, each segment extending between the end surfaces and being located between a pair of adjacent segments; and each segment has a cutting section located between a leading wall located on leading surface of that segment and a trailing wall located on a trailing surface of that segment.

5. The cutting tool according to claim 4, wherein:
the securing portion additionally comprises:
a hole formed in the base, the hole extending along a holder axis and opening out to the base; and
the cutting insert comprises:
opposing end surfaces, the peripheral side surface being located between the end surfaces; and
a bore extending along an insert axis between the end surfaces; and
the cutting tool further comprises:
a fastener located in the bore and the hole.

6. The cutting tool according to claim 4, wherein:
the leading surface and the trailing surface belonging to adjacent segments meet at a corner forming a radially innermost portion of the peripheral side surface; and
the leading surface and the trailing surface belonging to adjacent segments diverge outwardly from the corner in a direction away from the insert axis (B).

7. The cutting tool according to claim 6, wherein:
the first wall is a trailing wall of a first segment;
the second wall is a leading wall of a second segment adjacent to the first segment; and
the third wall is a trailing wall of a third segment adjacent to the second segment.

8. A method of assembling a cutting tool comprising:
providing an insert holder comprising a forward securing portion and a rear body portion, the securing portion comprises a base, a hole formed in the base, a lower forward first support, a lower rear second support and an upper third support, a bulge axis of the insert holder intersecting the securing portion adjacent the first and the second supports,
providing a cutting insert comprising an insert axis, opposing end surfaces, a bore extending along the insert axis between the end surfaces, a first wall, a second wall, a third wall and at least one cutting section, the at least one cutting section comprises a cutting edge located between a rake face and a relief face, the rake face extends rearwardly from the cutting edge and the relief face extends downwardly from the cutting edge and away from the rake face,
placing the cutting insert in an initial assembly position in the securing portion in which the first wall faces the first support, the second wall faces the second support and the third wall faces the third support,
placing a fastener through the bore of the cutting insert and into the hole formed in the base of the securing portion,
urging the cutting insert forwardly and downwardly to an intermediate assembly position in which the first and the second walls respectively bear against the first and the second supports,
urging the cutting insert further forwardly and downwardly and thereby rotating the cutting insert about the bulge axis until a final assembly position is reached in which the third wall bears against the third support in addition to the first and the second walls respectively bearing against the first and the second supports.

9. The method according to claim 8, wherein:
the base is transverse to the first, second and third supports and the hole extends along a holder axis and opens out to the base, the bulge axis being generally parallel with the holder axis and intersecting the securing portion below the first and the second supports;
the cutting insert comprises a peripheral side surface located between the end surfaces, the side surface comprises the first wall, the second wall, the third wall and the at least one cutting section.

10. The method according to claim 8, wherein in the initial assembly position one of the end surfaces of the cutting insert faces the base of the securing portion and in the intermediate assembly position the one of the end surfaces bears against the base.

11. The method according to claim 8, wherein the fastener urges the cutting insert to the intermediate and final assembly positions.

12. The method according to claim 8, wherein in the initial, intermediate and final assembly position the bore is eccentric in relation to the hole.

13. A cutting tool having a tool axis (A) establishing a forward-to-rear direction, the cutting tool comprising a cutting insert having five-fold rotational symmetry seated in an insert holder;
the cutting insert having an insert axis (B), and comprising:
two identical opposing end surfaces;
a through bore extending axially along the insert axis (B) and connecting the two identical opposing end surfaces; and
a peripheral side surface located between the end surfaces and being divided into five identical segments, wherein:
each segment extends between the end surfaces and is located between a pair of adjacent segments,
each segment has a cutting section located between a leading wall located on leading surface and a trailing wall located on a trailing surface,
the trailing surface of one segment and the adjacent leading surface of an adjacent segment meet at a corner which forms a radially innermost portion of the peripheral side surface; and
the trailing surface of a first segment and the adjacent leading surface of a second segment adjacent to the first segment, diverge outwardly from the corner in a direction away from the insert axis (B);
the insert holder comprising:
a forward securing portion and a rear body portion,
the forward securing portion comprises a base and securing surface,
the securing surface including a first support, a second support and a third support which all extend transversely to the base;
wherein:
at least a portion of the first support abuts at least a portion of a trailing wall of a first segment of the cutting insert;

at least a portion of the second support abuts at least a portion of a leading wall of a second segment of the cutting insert, the second segment being adjacent to the first segment;

at least a portion of the third support abuts at least a portion of trailing wall of a third segment of the cutting insert, the third segment being adjacent to the second segment; and the trailing wall of the third segment of the cutting insert generally faces upwardly.

14. The cutting tool according to claim 13, wherein the first, second and third supports constitute the only abutment surfaces between the securing portion and the peripheral side surface of the cutting insert.

15. The cutting tool according to claim 13, wherein the securing portion has unitary one-piece construction.

16. The cutting tool according to claim 13, further comprising:

a fastener passing through the cutting insert's through bore and extending into a hole formed in the base, the hole extending about a holder axis and opening out to the base.

* * * * *